(12) United States Patent
Zeitler et al.

(10) Patent No.: US 7,734,017 B2
(45) Date of Patent: Jun. 8, 2010

(54) ANTI-SCATTER-GRID FOR A RADIATION DETECTOR

(75) Inventors: Gunter Zeitler, Aachen (DE); Gereon Vogtmeier, Aachen (DE); Klaus Jurgen Engel, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 624 days.

(21) Appl. No.: 11/573,358

(22) PCT Filed: Aug. 8, 2005

(86) PCT No.: PCT/IB2005/052624

§ 371 (c)(1),
(2), (4) Date: Feb. 7, 2007

(87) PCT Pub. No.: WO2006/018779

PCT Pub. Date: Feb. 23, 2006

(65) Prior Publication Data

US 2009/0225938 A1    Sep. 10, 2009

(30) Foreign Application Priority Data

Aug. 12, 2004    (EP)    ................... 04103887

(51) Int. Cl.
*G21K 1/00*    (2006.01)
(52) U.S. Cl. ..................................... 378/154
(58) Field of Classification Search .................. 378/7, 378/19, 98.4, 98.8, 145, 147, 149, 154; 250/370.08, 250/370.09, 370.11
See application file for complete search history.

(56) References Cited

U.S. PATENT DOCUMENTS 6,618,466 B1    9/2003 Ning

FOREIGN PATENT DOCUMENTS

| JP | 57050674 A | 3/1982 |
| JP | 1313789 A | 12/1989 |
| JP | 2000070254 A | 3/2000 |

*Primary Examiner*—Courtney Thomas

(57) ABSTRACT

The invention relates to an Anti-Scatter-Grid (ASG) with lamellae (2) that absorb incident radiation (1, 8) and that produce an electrical signal proportional to the amount of absorbed radiation. The lamellae (2) may particularly consist of a semiconductor material in which photons produce electron-hole pairs that can be detected with the help of electrodes (3, 4, 6) on the sidewalls of the lamellae (2). The amount of absorbed scattered (8) or primary (1) radiation may thus be determined in a spatially resolved way, allowing to correct the image generated by an array (5) of sensor units (9).

10 Claims, 2 Drawing Sheets

ANTI-SCATTER-GRID FOR A RADIATION DETECTOR

The invention relates to an Anti-Scatter-Grid for a radiation detector, to a radiation detector with such an Anti-Scatter-Grid, to an examination apparatus with such a detector, and to a method for the determination of scattered radiation impinging on a radiation detector.

During the generation of images by the spatially resolved measurement of radiation intensity it is often necessary or desirable to discriminate radiation coming from a target direction from radiation coming from other directions. A typical example of this situation is the generation of medical X-ray images by a CT or some similar device. In this case the main interest is the spatially resolved measurement of primary radiation coming directly from the X-ray source. Due to scatter processes in the examined body, however, there is always secondary or scattered radiation present that impinges on the detector from directions other than the line of sight to the X-ray source, wherein such scattered radiation carries no usable image information. In order to improve image quality and the signal-to-noise ratio, it is therefore known to dispose an Anti-Scatter-Grid (ASG) in front of the detector, wherein said grid comprises radiation absorbing lamellae which define channels through which radiation from a target direction may freely pass, while scattered radiation coming from other directions will be largely absorbed. It is however impossible to remove all scattered radiation with an Anti-Scatter-Grid, and therefore the contribution of scattered radiation to a measured image signal remains a problem, particularly in image regions of weak signal intensity.

Though different approaches have been tested to deal with the aforementioned problems, no satisfying solution could yet be found.

The U.S. Pat. No. 6,618,466 B1 proposes for example a method in which the contribution of scattered radiation to an image is determined via the generation of images with and without a beam stop array and the application of interpolation techniques. Such a laborious method is however hardly to integrate into the normal medical workflow.

Based on this situation it was an object of the present invention to provide means for the reduction of negative effects of scattered radiation on image quality.

This object is achieved by an Anti-Scatter-Grid, a radiation detector, an examination apparatus and a method.

According to its first aspect, the invention relates to an Anti-Scatter-Grid for a radiation detector which comprises lamellae that strongly absorb radiation of a certain spectrum which shall be observed by the detector, for example X-radiation. The radiation may pass freely only through (void or transparent) channels which are established between the lamellae. The channels thus define lines of sight along which radiation may reach a detector at the "backside" of the Anti-Scatter-Grid. The Anti-Scatter-Grid may be one-dimensional, wherein the channels are planes between parallel lamellae, or two-dimensional, wherein two sets of parallel lamellae cross and define channels. Depending on the intended application of the Anti-Scatter-Grid, the channels/lamellae may for example be parallel to each other or focused on a certain point (typically a radiation source). Moreover, it is an important feature of the radiation absorbing lamellae that they are adapted to produce a signal that indicates the amount of radiation absorbed by said lamellae. The signal may for example be proportional to the total energy of the absorbed radiation.

An Anti-Scatter-Grid of the aforementioned kind absorbs scattered radiation coming from directions other than a target direction defined by the channels of the grid, thus shielding a detector behind the Anti-Scatter-Grid from undesired radiation. Besides this, the Anti-Scatter-Grid yields a signal that indicates the amount of absorbed radiation. Based on this signal it is possible to estimate the fraction of scattered radiation that is actually present and thus also the amount of scattered radiation that reaches the detector despite of the Anti-Scatter-Grid. This in turn allows to correct the image signals of the detector and to improve image quality.

According to a preferred embodiment, the lamellae of the Anti-Scatter-Grid comprise a semiconductor material that converts absorbed radiation into electrical signals. The electrical signals may particularly be based on the generation of free current carriers (e.g. electron-hole pairs).

In order to maximize the sensitivity of the aforementioned semiconductor lamellae, it is preferred that they comprise a material with a low intrinsic energy conversion coefficient for the conversion of photons of the absorbed radiation into electron-hole pairs, wherein said coefficient may particularly be lower than 10 eV per electron-hole pair.

According to another embodiment of the invention, the lamellae comprise a scintillator material for the conversion of incident radiation of a first energy level (e.g. X-rays) into radiation of a second energy level (e.g. visible photons). The second energy level of the radiation generated in the scintillator material is then typically such that it may more readily be detected, e.g. by the aforementioned semiconductor material. The scintillator material is preferably disposed as an outer layer on the surface of the lamellae.

Moreover, the lamellae may preferably comprise a material with a high absorption coefficient, particularly higher than 1 $cm^{-1}$, for photons with energies below 150 keV. Such lamellae make the Anti-Scatter-Grid suited for use with an X-ray detector. The material with such a high absorption coefficient may particularly be a heavy metal with an atomic weight above 40.

One preferred example of a material for the lamellae is CdZnTe which has both a low intrinsic energy conversion coefficient and a high absorption coefficient for X-rays.

As was already mentioned, the lamellae may particularly generate an electrical signal that corresponds to the dose of absorbed radiation. In this case, the lamellae are preferably covered completely or partially by electrodes, said electrodes allowing to induce an electrical field inside the lamellae and to collect charge carriers generated by absorbed radiation. The electrodes may typically consist of metal, particularly of Pt. Preferably there is a plurality of separate electrodes which allow a spatially resolved measurement of absorbed radiation. In a two-dimensional Anti-Scatter-Grid, one electrode may for example be located on each wall of each channel.

In the aforementioned embodiment, at least one of the electrodes may optionally end a distance away from the edge of the corresponding lamella on which said electrode resides. Processes in the margin of said lamella are therefore not influenced by the electrode. The distance of the electrode from the edge is preferably so large that radiation will substantially (e.g. to more than 90%, preferably more than 98%) be absorbed by the material of the lamella over said distance. Therefore, (primary) radiation that is parallel to the lamellae and hits them at their edge will be absorbed in the lamella within the margin not covered by the electrode; contributions from said radiation will thus not be measured by the electrode, allowing the better separation between primary and scattered radiation. More details on this topic will be discussed in the description of preferred embodiments.

The aforementioned electrodes which end a distance away from the edge are preferably mixed in the Anti-Scatter-Grid with electrodes that extend to the edge. The long and short electrodes may for example alternate from pixel to pixel. Such an arrangement allows a spatially alternating measurement of radiation absorbed by the lamellae with and without contributions from primary radiation. Therefore, the fractions of primary radiation and scattered radiation can be discriminated in a spatially resolved way.

The invention further comprises a radiation detector with the following components:

An Anti-Scatter-Grid of the aforementioned kind which comprises radiation absorbing lamellae that produce a signal related to the amount of absorbed radiation.

Optionally a converter for the conversion of incident radiation of a first energy level into radiation of different energy level. In X-ray detectors, such a converter is known as scintillator which converts incident X-rays into photons of visible light.

An array of radiation sensitive sensor units that can measure the radiation passing through the Anti-Scatter-Grid (directly or after conversion by the converter) in a spatially resolved way.

A signal processing unit for the evaluation of signals generated by the Anti-Scatter-Grid. The signal processing unit may particularly comprise electronics for the amplification, correction and/or analogue-to-digital conversion of signals from the Anti-Scatter-Grid. Moreover, it may comprise a digital data processing device (with e.g. microprocessor, memory, I/O interfaces etc.) for the evaluation of said signals.

According to a preferred embodiment, the signal processing unit may be adapted to discriminate fractions of incident radiation with respect to their parallelism to the channels/lamellae of the Anti-Scatter-Grid. Thus, the signal processing unit may (at least approximately) determine the fraction of the incident radiation that is parallel to the channels and therefore probably primary radiation as well as the fraction of radiation that is not parallel to the channels and therefore probably scattered radiation. Preferably, the processing unit determines said fractions spatially resolved in order to allow a local correction of an image generated by the sensor units.

The invention further relates to an examination apparatus, particularly an X-ray, CT (Computed Tomography), PET (Positron Emission Tomography), SPECT (Single Photon Emission Computed Tomography) or nuclear imaging device, which comprises an X-ray sensitive radiation detector of the aforementioned kind.

Finally, the invention comprises a method for the determination of scattered radiation impinging on a radiation detector with an Anti-Scatter-Grid, wherein the amount of radiation absorbed by the Anti-Scatter-Grid is directly measured. The measurement is preferably executed in a spatially resolved way.

The radiation detector, the examination apparatus and the method share the essential features of an Anti-Scatter-Grid of the kind described above. Therefore, reference is made to the preceding description for more information on the details, advantages and improvements of these objects.

These and other aspects of the invention will be apparent from and elucidated with reference to the embodiment(s) described hereinafter.

BRIEF DESCRIPTION OF THE DRAWINGS

In the following the invention is described by way of example with the help of the accompanying drawings in which:

FIG. 1 depicts in a principal sketch (not to scale) a section through a (small part of a whole) detector array 5 of single sensor units 9 (pixels) that is disposed underneath a two-dimensional Anti-Scatter-Grid ASG. Such an arrangement may for example be used in a CT device for the spatially resolved measurement of X-radiation. The X-ray signal of the sensor units 9 is then a superposition of both the transmitted primary radiation 7 (the signal one is interested in) and a signal arising from scatter radiation 8 (which is undesirable and reduced by the Anti Scatter Grid ASG). The presence of scattered X-rays 8 in the projections of a CT acquisition leads to cupping and shadowing artifacts, and thus visible degradation of the reconstructed CT image. In the region near the detector centre, the scatter radiation 8 is typically of a similar order of magnitude as the primary radiation 7, and might even cover the primary signal in areas of weak intensity. Typically, 5% to 15% of the incident scatter radiation 8 are transmitted through an ASG used in front of the detector 5. However, especially for areas with high attenuation, the knowledge of the primary intensity is crucial for image reconstruction.

Figure 1:
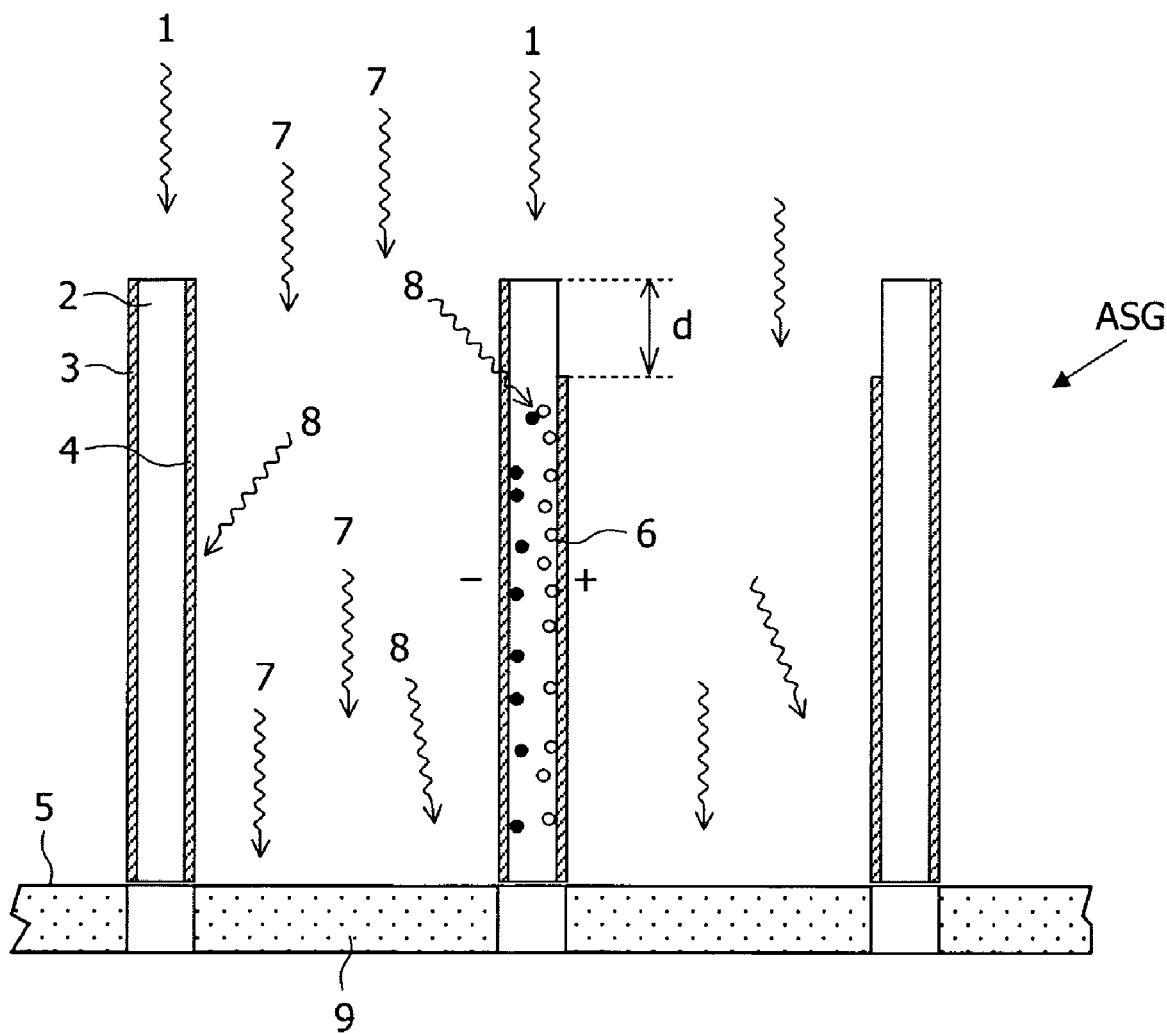
FIG. 1 a diagrammatic side view of a part of an Anti-Scatter-Grid and an array of sensor units according to the present invention.

Presently, scatter radiation 8 is detected—if at all—by extra detector cells outside the active detector area of a CT system. The scatter signal within the detector area is determined by interpolation from the values measured at the border. The quality of the interpolation is—more or less—sufficient for small fan beam width, however, it does not take into account shadowing of scatter radiation by small objects within the fan beam. For large area detectors, this concept fails, since the distance between the border detectors will not give detailed information about the scatter distribution in the centre detector area.

The main problem outlined in the previous section is the unknown detailed distribution of scattered photons 8 in the measured tomographic projections leading to image degradation. This effect becomes even more important in future systems, since the trend towards large scan areas (cone beam) increases the amount of scatter radiation rapidly due to a larger irradiated area. In the following an approach is described that gives access to a direct measurement of the scatter distribution for the whole detector area with a spatial resolution within the range of the pixel size. The basic idea of this approach is the detection/measurement of scattered X-rays 8 by the ASG itself. The measurement gives information on the spatial scatter photon distribution, allows for an improved scatter correction in the measured projections, and thus results in a higher CT image quality.

According to the preferred embodiment shown in the Figures, the Anti-Scatter-Grid ASG comprises walls or lamellae 2 of a direct conversion material that detects scattered photons 8 ("active detection") and simultaneously absorbs these quanta analogous to a conventional ASG ("passive collimation")—which means that the ASG acts as an "active collimator". The direct converting material may for example be a (crystalline, polycrystalline or amorphous) semiconductor which converts the energy of absorbed radiation 1, 8 directly into electron-hole pairs. Preferably the material has both a low intrinsic energy conversion coefficient (e.g. CdZnTe: 5 eV/electron-hole pair) resulting in a high response signal, and a high absorption coefficient for the relevant energy range (>30 keV). In addition, the direct conversion material should have a high atomic weight Z to absorb X-ray photons most effectively (e.g. for CdZnTe: Z≈49).

In its geometrical dimensions the grid ASG is similar to a conventional two-dimensional Anti-Scatter-Grid with a typical thickness of the lamellae 2 of approximately 100 μm. The height is chosen appropriately concerning absorption efficiency, technical availability, and costs with a typical range being 10 mm to 50 mm. Between the lamellae 2, a channel is formed through which radiation 7, 8 may pass to sensor units 9 or pixels located underneath the ASG in a detector array 5.

Figure 2:
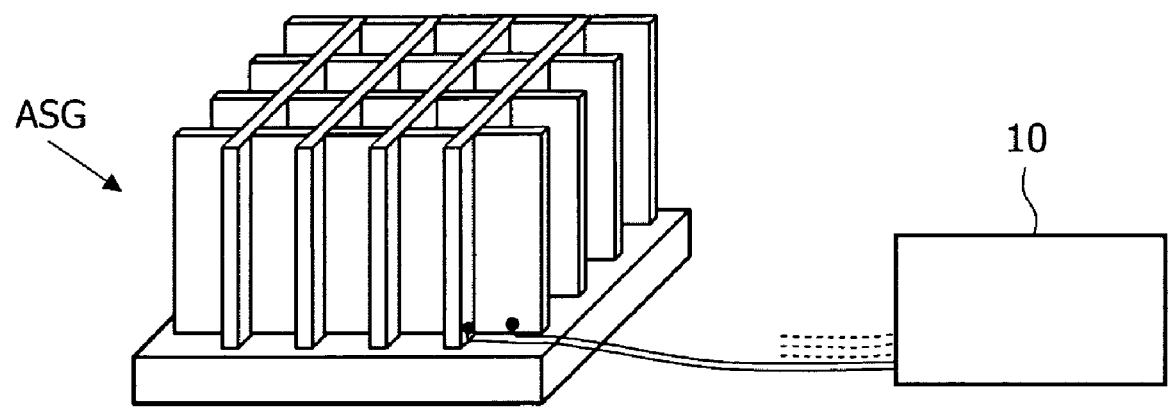
FIG. 2 shows the arrangement of FIG. 1 in a perspective view together with a signal processing unit.

The lamellae 2 are covered on each side by an electrode 3, 4, 6, wherein the opposing electrodes are driven as anode and cathode, respectively, by an external circuit (only schematically shown in FIG. 2 for two electrodes). The electrodes 3, 4, 6 at the sidewalls consist of a very thin layer of metal (e.g. Pt) each. The metal layer must be thin enough to ensure that only a negligible amount of scattered X-rays 8 is absorbed without giving rise to a signal.

Normally, an electron photocurrent through the direct conversion material of the lamellae 2 is the preferred mode of operation, since the mobility-lifetime product for electrons is much higher than for holes (e.g. CdZnTe (optimized material): $\mu_e \tau_e \approx 3 \cdot 10^{-3}$ cm²/V >> $\mu_h \tau_h$ $5 \cdot 10^{-5}$ cm²/V). Typically, the applied electric fields are of the order of 1 kV/cm. So, for a 100 μm thick lamella a bias voltage of only 10 V is needed to ensure sufficient charge collection efficiency. This low bias voltage involved in the operation of the detector lamellae 2 is easy to handle and makes no special protection of circuits necessary.

With the help of the electromagnetic field (bias field) that is induced via the electrodes 3, 4 and 6, charge carriers are separated and collected by drift to the electrodes giving rise to an electric signal which can be processed by succeeding readout electronics 10 (FIG. 2). For each rectangular pixel 9 this signal can be considered as an integral value of the four lamellae surrounding it. Thus, a spatial intensity distribution of the scatter radiation 8 in the detector array 5 is obtained with the resolution of one pixel.

Concerning the geometry of the electrodes there are two concepts shown in FIG. 1. In a first concept the electrode 4 (preferably the anode contact) covers the complete height of the ASG up to the upper edge of the lamella 2. This results in a sensitivity of the direct conversion material not only to scatter radiation 8 but also to primary radiation 1 which impinges on the upper end face of the lamella 2, causing some difficulties to disentangle the real scatter distribution afterwards. In contrast, electrodes 6 (anode contacts) ending a distance d short below the top edge of the lamella 2 are insensitive to radiation impinging on top of the ASG. Thus, these electrodes 6 measure the whole scatter radiation 8 distribution with the exception of the distribution from the direction of the primary X-ray beam 1, i.e. they are highly sensitive to scatter radiation 8. To ensure a total absorption of at least 99% of X-ray radiation with energies below 120 keV one must allow for an absorption layer of a certain thickness d (e.g. of d=6 mm for CdZnTe). This means that the short anode 6 should be at least 6 mm shorter than the long electrodes 3, 4. By this, one lowers the electric fields in the top region of the lamella 2 to such an extent that charge generated by the absorption process in this region has no contribution to the photocurrent, since it cannot be collected by the short anode 6.

Figure 3:
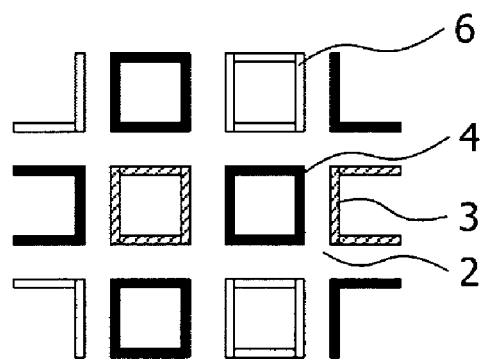
FIG. 3 shows a top view of the arrangement of FIGS. 1 and 2 in which pixels with long and short anodes alternate.
Figure 4:
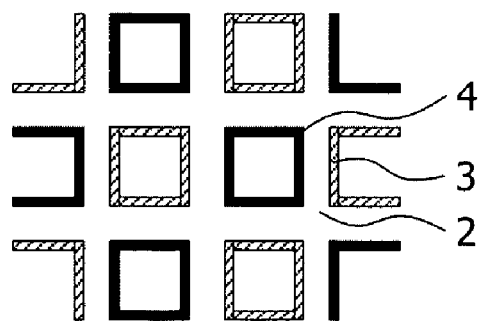
FIG. 4 shows a top view similar to FIG. 3 according to an alternative embodiment in which all electrodes are long.

As indicated in the top view of the Anti-Scatter-Grid ASG in FIG. 3, one can combine the concepts of long electrodes 3, 4 and short electrodes 6 leading to a pattern like a chessboard which allows to acquire different primary-to-scatter ratios (i.e. lamellae covered with long electrodes 3, 4 only measure full primary and scatter intensity, and lamellae covered with one short electrode 6 measure mainly scatter radiation). As will be discussed below, it is thus possible to precisely determine and separate the primary signal from the mixed primary/scatter signal measured at the pixilated detector. Alternatively, one can use each concept alone (cf. FIG. 4 for long electrodes 3, 4) which allows also to correct for the signal of each detector pixel 9, but with a higher systematic error due to the fact that the radiation distribution from different sources cannot be disentangled.

Any detector pixel n of the detector gives a signal $I_n$ which is a linear combination of incident primary dose $P_n$ (radiation 1+7 in FIG. 1) and incident scatter dose $S_n$ (radiation 8 in FIG. 1). In the following it is assumed that only scatter radiation nearly perpendicular to the surface of the detector 5 ($\vartheta \approx 90°$) can pass the ASG lamellae 2 without being absorbed, i.e. $S_n = S_n(\vartheta \approx 90°)$:

$$I_n = \alpha_n \cdot P_n + \beta_n \cdot S_n(\vartheta \approx 90°). \quad (1)$$

Scatter radiation with angles $\vartheta$ different from a small interval around 90° is strongly absorbed by the ASG. Lamellae 2 with long anodes 4 up to the top edge of the ASG lead to a signal $I'_n$ per pixel which is given by the following equation:

$$I'_n = \alpha'_n \cdot P_n + \beta'_n \cdot S_n(\vartheta \approx 90°) + \gamma'_n \cdot S_n(\vartheta \neq 90°) \quad (2)$$

The intensity signal $I''_n$ per pixel obtained from lamellae 2 with short anodes 6 is nearly insensitive to both primary radiation and scatter radiation with $\vartheta \approx 90°$:

$$I''_n = \gamma''_n \cdot S_n(\vartheta \neq 90°). \quad (3)$$

The signals sampled from the scatter detector arrays have to be calibrated and corrected. The coefficients $\alpha_n$, $\beta_n$, $\gamma_n$, $\alpha'_n$, $\beta'_n$, $\gamma'_n$, and $\gamma''_n$ can be determined by an appropriate calibration procedure. In standard CT detectors, the scintillator pixels 9 below the ASG, cognizant for detection of primary radiation 7, will ideally have coefficients $\alpha_n \to 1$ and $\beta_n \to 0$ (cf. Eq. (1)). The scatter detector values $I'_n$ including radiation impinging on top of the ASG (cf. Eq. (2)) will ideally have coefficients $\alpha'_n \to 0$ and $\beta'_n \to 1$ and $\gamma'_n \to 0$. In this ideal case the signal $I''_n$ (cf. Eq. (3)) would be irrelevant to determine $P_n$ per pixel. In the general case of a real detector setup, however, the relevant scatter corrected signal $P_n$ per pixel is obtained algebraically by solving the system of linear equations (1)-(3):

$$P_n = \frac{\beta'_n \gamma''_n I_n - \beta_n \gamma''_n I'_n + \beta_n \gamma'_n I''_n}{\alpha_n \beta'_n \gamma''_n - \alpha'_n \beta_n \gamma''_n} \quad (4)$$

The signal intensities $I_n$, $I'_n$ and $I''_n$ are measured and the other parameters are known by a dedicated calibration procedure.

In summary, the following advantages of the proposed ASG detector modules based on the principle of active collimation can be achieved:

- Improved CT image quality by scatter distribution measurement and subsequent scatter correction in CT systems.
- The scatter distribution is measured for the complete detector area, not only for certain punctual areas.
- The Anti Scatter Grid acts simultaneously as X-ray detector and as absorber (active collimation) leading to a very compact and simple setup.
- Since direct conversion material might be also the choice for CT detectors it is advantageous with respect to costs and technical feasibilities to have an ASG made from the same material as the detector pixels.

No sophisticated optical projection system is necessary. Thus, there is neither a distortion in geometry as well as in intensity distribution of the detected scatter, nor difficulties concerning the signal-to-noise ratio.

Since the ASG itself is used as scatter detector, there is only additional but never any loss in information and performance of the CT detector and thus in image quality.

Selective detection of scatter radiation—which is done by a special combination of longer and shorter electrodes making some pixels insensitive for primary radiation impinging at a lamella on top—gives a very precise access to the relevant primary radiation.

Finally it is pointed out that in the present application the term "comprising" does not exclude other elements or steps, that "a" or "an" does not exclude a plurality, and that a single processor or other unit may fulfill the functions of several means. Moreover, reference signs in the claims shall not be construed as limiting their scope.

The invention claimed is:

1. An Anti-Scatter-Grid for a radiation detector, comprising radiation absorbing lamellae which are adapted to produce a signal that indicates an amount of absorbed radiation.

2. The Anti-Scatter-Grid according to claim 1, wherein the lamellae comprise a semiconductor material which converts absorbed radiation into electrical signals, particularly a material with a low intrinsic energy conversion coefficient for conversion of photons into electron-hole pairs.

3. The Anti-Scatter-Grid according to claim 1, wherein the lamellae comprise a scintillator material for conversion of incident radiation of a first energy level into radiation of a second energy level.

4. The Anti-Scatter-Grid according to claim 1, wherein the lamellae comprise a material with a high absorption coefficient, particularly higher than $1\ cm^{-1}$, for photons with energies below 150 keV.

5. The Anti-Scatter-Grid according to claim 1, wherein the lamellae are at least partially covered by electrodes.

6. The Anti-Scatter-Grid according to claim 5, wherein at least one of the electrodes ends at a distance away from an edge of the corresponding lamella, wherein said distance is preferably such that radiation traveling through the material of the lamella is substantially absorbed after said distance.

7. The Anti-Scatter-Grid according to claim 6, wherein it comprises both electrodes ending at a distance away from an edge and electrodes ending at the edge of the corresponding lamella.

8. A radiation detector, comprising
an Anti-Scatter-Grid according to claim 1;
optionally a converter for conversion of incident radiation of a first energy level into radiation of a different energy level;
an array of radiation sensitive sensor units;
a signal processing unit for evaluation of signals generated by the Anti-Scatter-Grid.

9. The radiation detector according to claim 8, wherein the signal processing unit is adapted to discriminate fractions of incident radiation with respect to their parallelism to channels and/or lamellae of the Anti-Scatter-Grid.

10. An examination apparatus with an imaging system, particularly an X-ray, CT, PET, SPECT or nuclear imaging device, the imaging system comprising an X-ray sensitive radiation detector according to claim 8.

* * * * *